Figure 1:
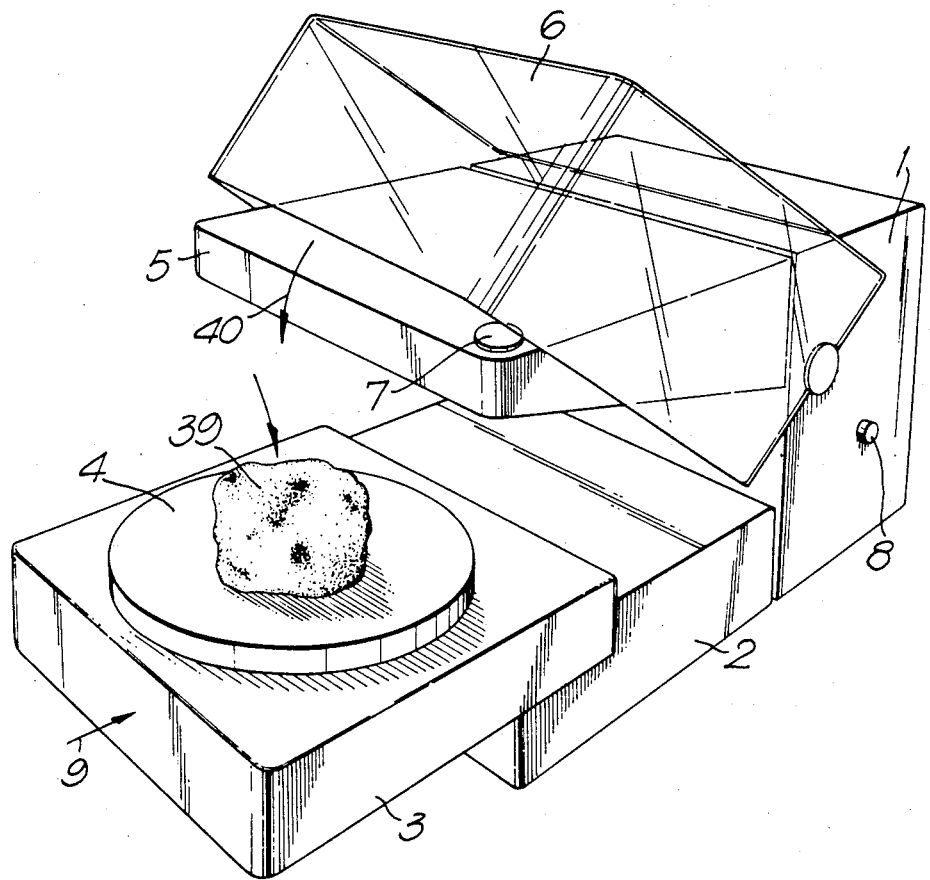

United States Patent [19]

Finlay

[11] Patent Number: 4,806,090

[45] Date of Patent: Feb. 21, 1989

[54] CHAPATI MAKING MACHINE

[75] Inventor: Patrick A. Finlay, Slough, United Kingdom

[73] Assignee: Richford Holdings, Inc., Luxembourg, Luxembourg

[21] Appl. No.: 8,725

[22] Filed: Jan. 30, 1987

[30] Foreign Application Priority Data

Jan. 30, 1986 [GB] United Kingdom ................. 8602257

[51] Int. Cl.$^4$ ............................................. A01J 21/00
[52] U.S. Cl. .................................... 425/194; 425/267; 425/363; 425/394; 425/418
[58] Field of Search ............................... 425/193–195, 425/200, 418, 263, 265, 267, 268, 363, 394; 426/496, 502

[56] References Cited

U.S. PATENT DOCUMENTS

| | | | |
|---|---|---|---|
| 1,628,828 | 5/1927 | Denmead | 425/267 |
| 3,461,821 | 8/1969 | Gallus | 107/15 |
| 4,559,002 | 12/1985 | Atwood | 425/152 |

FOREIGN PATENT DOCUMENTS

| | | | |
|---|---|---|---|
| 157660 | 3/1904 | Fed. Rep. of Germany . | |
| 3150431 | 7/1983 | Fed. Rep. of Germany | 425/267 |
| 0015194 | 9/1980 | France . | |
| WO8601078 | 2/1986 | PCT Int'l Appl. . | |
| 322804 | 12/1929 | United Kingdom | 425/267 |
| 1048743 | 11/1966 | United Kingdom | 425/267 |
| 1268521 | 3/1972 | United Kingdom | 425/267 |

*Primary Examiner*—Bernard Nozick
*Attorney, Agent, or Firm*—Spencer & Frank

[57] ABSTRACT

An apparatus for use when manufacturing a substantially circular dough product, said apparatus comprising a turntable defining a planar surface, and conical roller means adapted to cooperate with said turntable and defining a rolling line in the region of the roller close to said planar surface, the turntable being rotatable to permit effective movement between said rolling line and the turntable, the apparatus being provided with means to cause the roller and turntable to move from a relative space to part position to an operative position with a reduced spacing therebetween for a predetermined operational period of time and to cause the roller and the turntable subsequently to return to the initial spaced apart position.

13 Claims, 4 Drawing Sheets

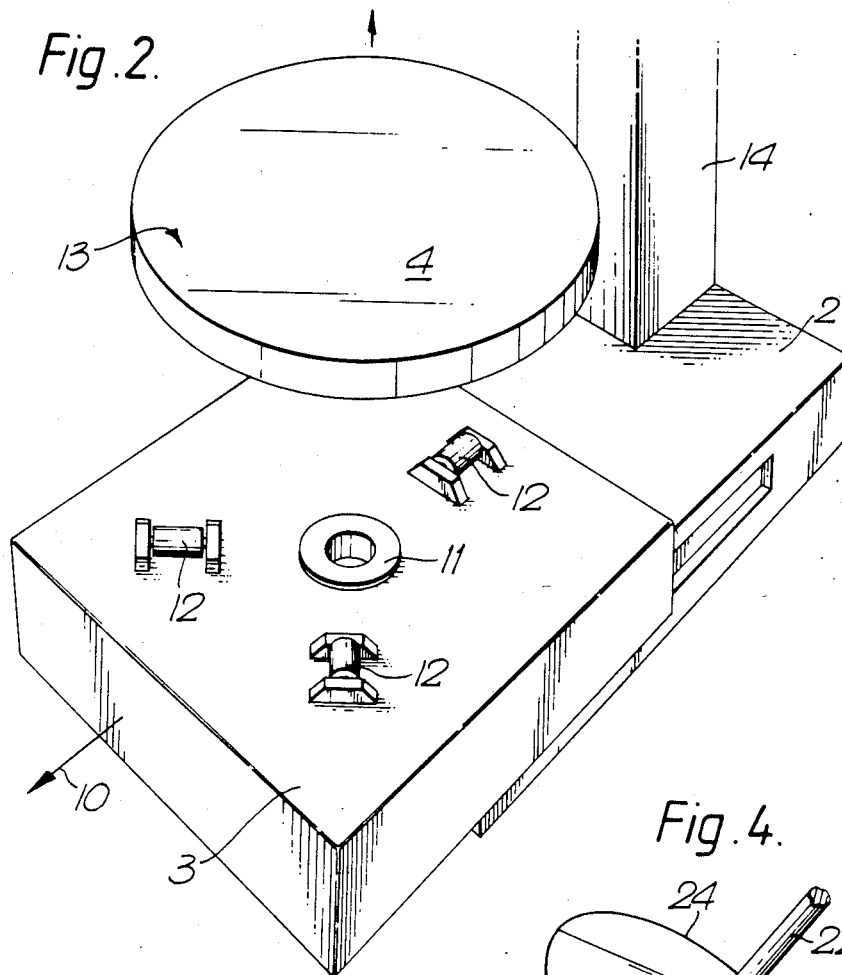
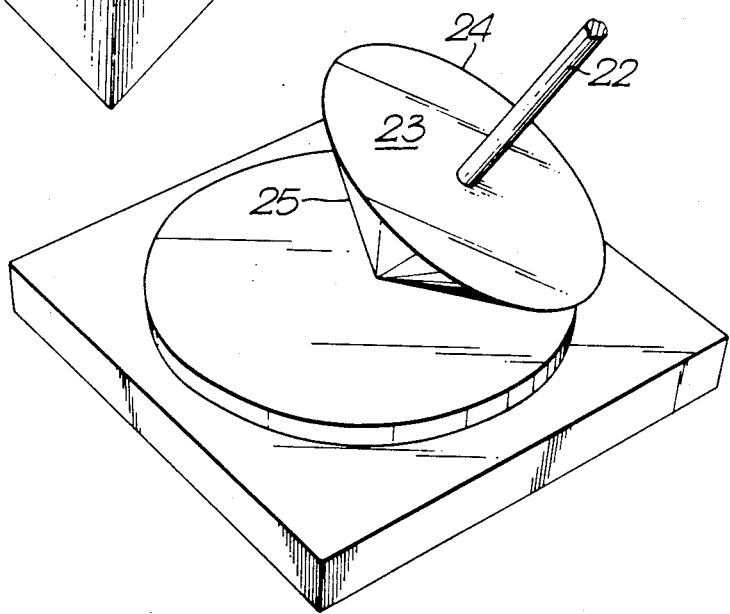

CHAPATI MAKING MACHINE

The present invention relates to an apparatus for use in making dough products and more particularly to an apparatus in making dough products that are of a circular configuration.

Many people throughout the world, particularly people living in Asia, or of Asiatic origin, make their own dough products on a daily basis. These dough products are most often in the form of round substantially flat pieces of dough which are appropriately cooked. Examples of such dough products are chapati, puri, paratha, roti, nan, tortilla, panadams and pancakes. Usually the housewife makes the dough products each evening, and this involves the steps of mixing the appropriate dough, and then using a rolling pin and a flat surface to roll appropriate portions of the dough to the required circular configuration and the desired thickness. The circular dough portions are then cooked appropriately.

In many instances it is a sign of a good housewife that all the dough products that she makes are of precisely the same diameter and precisely the same thickness and have perfect circularity. This, of course, involves a considerable amount of skill, and also occupies a considerable amount of time, since it is difficult to roll a perfectly circular dough element from a portion of dough.

The present invention seeks to provide an apparatus that may be utilised in the production of circular dough products of the type generally described above.

According to this invention there is provided an apparatus for use when manufacturing a substantially circular dough product, said apparatus comprising a turntable defining a planar surface, and conical roller means adapted to cooperate with said turntable and defining a rolling line in the region of the roller close to said planar surface, the turntable being rotatable to permit effective movement between said rolling line and the turntable, the apparatus being provided with means to cause the roller and turntable to move from a relative space to part position to an operative position with a reduced spacing therebetween for a predetermined operational period of time and to cause the roller and the turntable subsequently to return to the initial spaced apart position.

Preferably a single prime mover is utilised to drive the conical roller rotationally and to effect said movement between the turntable and the conical roller so that the turntable and roller are maintained in the operative position for a predetermined number of rotations of the conical roller.

Conveniently the means to effect the relative vertical movement between the turntable and the conical roller comprise cam means driven by a motor that drives the conical roller, the cam being adapted to cause the conical roller or the turntable to move through a predetermined sequence of movements in the vertical direction.

Advantageously said cam is associated with adjustment means which can be operated to effect an adjustment of the spacing between the operational surface of the conical roller and the planar surface of the turntable when the roller and the turntable are in the operative position.

Preferably the angle of the conical roller is an obtuse angle.

Conveniently the turntable and the conical roller are provided with a non-stick finish.

Advantageously the rolling surface of the roller and the upper surface of the turntable have different properties, the surface of the cone having a greater or better "non-stick" characteristic than the surface of the turntable.

Preferably the conical roller is removable, and wherein one or more food processing elements are provided which can be mounted in position to be driven by means intended to drive the cone, to effect a food processing operation.

The apparatus may be provided with an interlock guard adapted to prevent operation of the apparatus unless the interlock guard is in a predetermined position.

Figure 3:
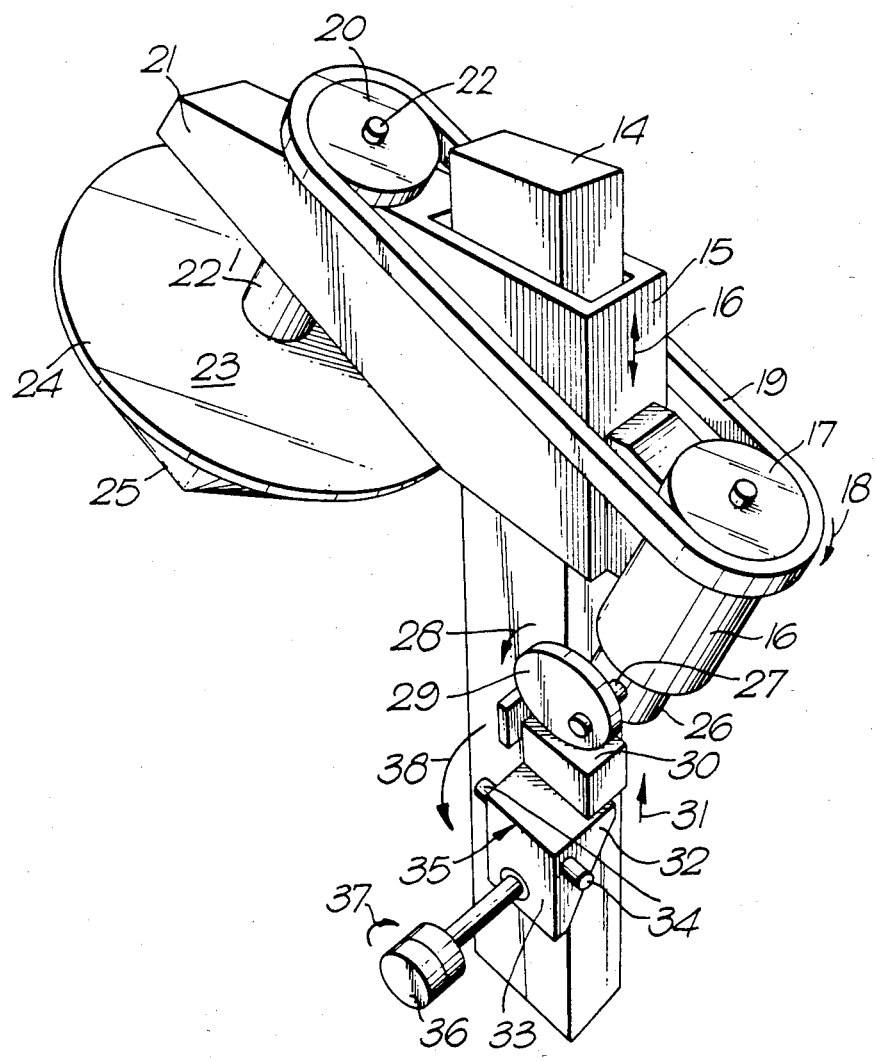
Figure 5:
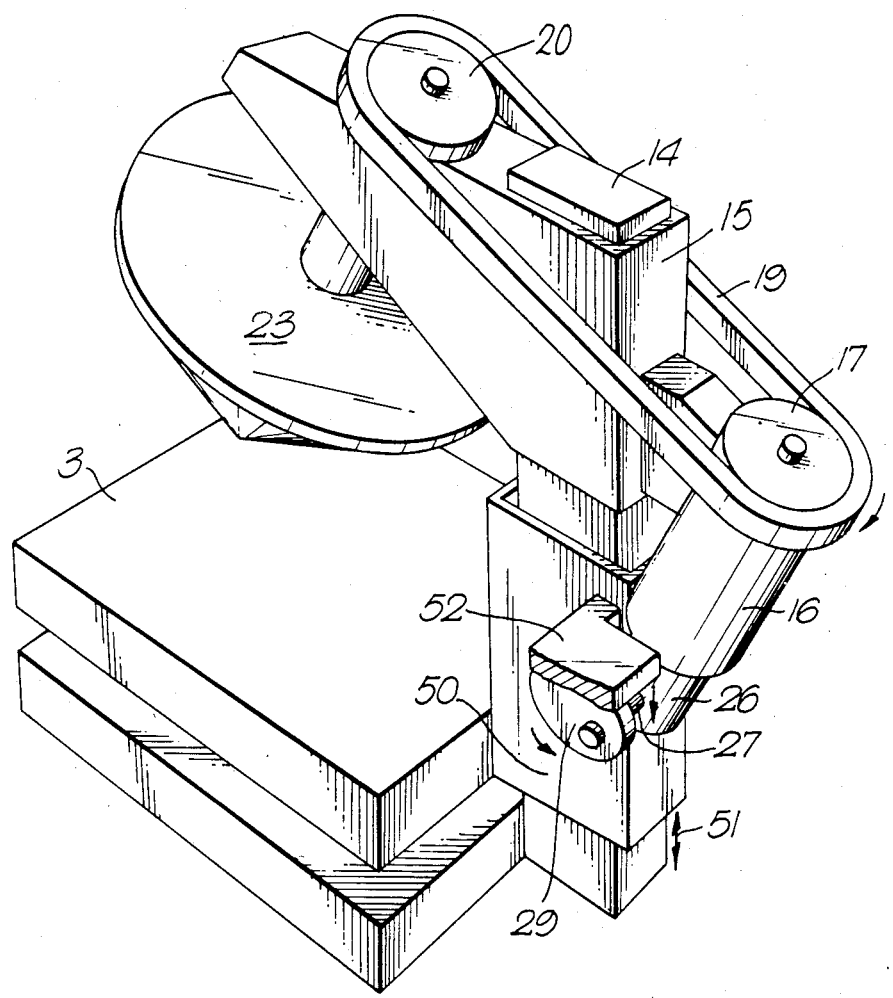

In order that the invention may be more readily understood, and so that further features thereof may be appreciated, the invention will now be described, by way of example, with reference to the accompanying drawings in which:

FIG. 1 is a perspective view of one embodiment of an apparatus in accordance with the invention, showing an apparatus in accordance with the invention at the beginning of an operational cycle, FIG. 2 is an enlarged view of the base portion of the apparatus shown in FIG. 1, FIG. 3 is an enlarged view of the cone, and the cone support and drive assembly of the apparatus shown in FIG. 1, FIG. 4 is a diagrammatic view illustrating the cooperating of the cone and the turntable of the apparatus shown in FIG. 1, and FIG. 5 is a view corresponding generally to FIG. 3, but illustrating an alternative embodiment of the invention.

Dealing initially with the apparatus shown in FIGS. 1 to 4 of the accompanying drawings it will be observed that the apparatus comprises a housing 1 which is associated with a forwardly projecting base portion 2. Mounted on the forwardly extending base portion 2 is a slidable table 3, on which is rotatably supported a turntable 4. The housing has a forwardly projecting cone supporting portion 5 which extends above the base portion 2. A hinged cover 6 is hingedly mounted on the housing 1. The cover may be formed of a transparent or translucent material. The cover may be moved to a position in which it effectively encloses the space between the table 3 and the supporting portion 5.

The cone supporting portion 5 has a "start" button 7 thereon, and the housing 1 has a control knob 8 which, as will be described hereinafter, can be utilised to adjust the thickness of a dough product made on the described apparatus. The knob 8 is mounted in an accessible position.

Referring now to FIG. 2 of the accompanying drawing, in which the housing 1 has been removed, it can be seen that the base 2 slidably supports thereon the table 3 in such a way that the table 3 can slide in as indicated by the arrow 9 in FIG. 1 and out as indicated by the arrow 10 in FIG. 2. The table 3 is provided with a central aperture 11 adapted to receive a spigot provided on the underside of the turntable 4, and is also provided with three support rollers 12 which are equally radially spaced from the hole 11, and which are equi-angularly spaced relative to the hole 11 so that rollers 12 support the turntable 4 in an even manner so that the turntable 4 may rotate readily about the axis defined by the aperture 11.

The turntable 4 may readily be lifted off support table 3 for cleaning purposes.

The turntable may be made of any appropriate material, but is is preferred that the upper surface 13 of the turntable is coated with a material having non-stick properties, such as polytetrafluorethylene as sold under the Registered Trade Mark "TEFLON".

As shown in FIG. 2 a support column is securely mounted at the rear edge of the base 2, the support column extending vertically upwardly. Referring now to FIG. 3 the support column 14 can be clearly seen. A shoe 15 is slidable mounted on the support column 14 for movement in an upward and downward direction as indicated by the arrow 16. Mounted on the shoe, at an angle to the vertical, is an electric motor 16. At the upper end of the motor 16 is provided a pulley drive wheel 17 which rotates, on operation of the motor 16, in the direction indicated by the arrow 18. The pulley drive 17 is mounted to drive a pulley belt 19 which passes on either side of the shoe 15 to drive a corresponding pulley wheel 20 which is mounted on an inclined axle 22 which passes through a forward extension 21 forming part of the shoe 15. The pulley drive wheels 17 and 20 lie in a common plane. The inclined axle 20 forms, at its lower end, a drive shaft 22 which is connected to the flat base 24 of a conical roller 23 having a conical rolling surface 25. The conical rolling surface 25 defines an apex which is an obtuse angle.

The conical face of the conical roller is also coated with a non-stick material such as polytetrafluorethylene as sold under the Registered Trade Mark "TEFLON", but it is preferred that the surface of the roller has a better "non-stick" property than the material of the turntable so that a dough product to be roller by the appartus will preferentially adhere to the turntable rather than preferentially adhering to the roller.

Mounted on the lower end of the motor 16 is a gearbox 26, from which protrudes horizontally a driven shaft 27. The driven shaft rotates at a slower rate than the pulley wheel 17, but rotates in the direction indicated by the arrow 28. Mounted on the shaft 27 is a cam 29. The cam is mounted in an eccentric manner, in that the axis of the shaft 27 intersects the cam at a point spaced from any centre of symmetry of the cam. The shape of the cam will be dictated by the function that it has to perform. The cam is located to cooperate with a thrust block 30. The thrust block is maintained in a predetermined position and as the cam rotates, the gearbox together with the motor and the sleeve 15 will be driven upwardly and downwardly, as indicated by the arrow 16, relatively to the support column 14. It will thus be appreicated, from a consideration of FIG. 4, that as the cam completes a cycle of operation, thus the cone will initially move from an elevated position to a lowered position, will remain in the lowered position, which can be considered to be an operative position for a predetermined period of time, and then will rise again to the initial or upper position.

In order to enable the distance between the conical surface of the conical roller and the turntable 4 to be adjusted, the thrust block 30 is adjustable mounted in position. The thrust block 30 is actually located in position on the support column in such a way that the thrust block 30 can move vertically upwardly and downwardly, as indicated by the arrow 31. The lower surface of the thrust block is engaged by one arm 32 of a bell crank 33 which is pivotally mounted by means of trunnions 34 located adjacent the apex 35 of the bell crank.

The second arm of the bell crank 35 is a depending arm and is engaged by a screw adjuster 36 actuated by the control knob 8 mentioned with reference to FIG. 1. As the screw adjuster is rotated in the direction of the arrow 37, the screw adjuster is driven inwardly thus causing the bell crank to rotate in the direction of the arrow 38, thus causing the thrust block to rise an indicated by the arrow 31. This will serve to increase the space between the conical roller and the turntable during the operative phase of an operational cycle of the described apparatus. Of course, if the control know 8 is moved in the opposite direction, the various components will all move in the opposite sense, the reducing the distance between the rolling surface of the cone and the turntable during the operative phase of an operational cycle.

In utilising the described apparatus, initially the table 3 will be moved to a forward position, as illustrated in FIG. 1, and a portion of dough 39 will be located in position on the turntable 4. The table 9 will then be pushed inwardly in the direction of the arrow 9, and the cover 6 may then be closed, in the direction of the arrow 40. The start button 7 may then be pressed. The motor will then be activated, thus causing the conical roller 23 to be driven in a rotational manner. Simultaneously the cam 29 will start to rotate and the conical roller will be lowered from an initial elevated position into the operation position. As the cone is lowered, so the conical rolling surface will engage the dough and start to roll the dough. As this happens the turntable begins to rotate. The spacing between the rolling surface of the cone and the upper surface of the turntable is determined by the adjustment of the bell crank 33, and the dough is thus rolled to have a predetermined thickness. At the end of the operational cycle the cam 29 will act to raise the cone back to the initial elevated position. Since the surface of the cone has a greater "non-stick" property than the surface of the turntable the now-rolled dough product will remain on the turntable. The product will be of a circular form and will be of a predetermined thickness. The cover 6 may then be raised and the table 3 slid back out to the extended position illustrated in FIG. 1. The dough product may then be removed from the turntable and, if desired, a fresh piece of dough may be located in position on the turntable. The described cycle of operation may then be repeated.

If desired the conical roller 23 may be removably mounted in position on the axle 20, and may thus be removed to be replaced by a desired food processing component such as, for example, a kneading hook. A bowl may then be placed on the table 3, the bowl containing material to be kneaded, and the described apparatus may thus be utilised to knead the dough. Of course, this kneading process would be carried out before the rolling process.

It is envisaged that, in addition to providing the described apparatus with a kneading hook, various other food processing elements may be provided such as beaters, whiskers or blenders.

Referring now to FIG. 5 of the accompanying drawings an alternative embodiment of the invention is illustrated. In this embodiment of the invention various components correspond directly with components present in the embodiment of the invention described above, and these corresponding components have corresponding reference numerals and will thus not be described again in detail. It is, however, to be noted that the shoe 15 on which the motor 16 and the conical roller 23 are mounted is, in this embodiment, securely fixed in position on the support column 14. The table 3 is mounted on the support column 14 by means of a sleeve 50 which is slidable upwardly and downwardly relative to the sleeve 15 as indicated by the arrow 51. The gear box 26 again carries the shaft 27 which is associated with an eliptic cam 29, but in this embodiment the cam 29 engages the undersurface of a thrust block 52. It will be appreciated that in this embodiment of the invention operation of the cam causes the turntable, which will be mounted on the table 3, to be brought up into a desired operational relationship relative to the conical roller 23.

Whilst the invention has been described by way of example with reference to particular preferred embodiments, it is to be noted that many modifications may be effected to these described embodiments without departing from the scope of the invention. For example, whilst the invention has been described with reference to an embodiment in which the turntable is mounted on a slidable table 3 which can slide in and out relative to the housing, the turntable may be fixed in position, and the conical roller may be mounted in position on a pivoted support assembly so that the conical roller and the associated drive mechanism may be pivoted upwradly away from the turntable, to facilitate the location of a portion of dough on the turntable, and to facilitate the removal of a roller circular dough product from the turntable.

It is to be noted that in the described embodiments of the invention since the cone is driven by the same motor that drives the cam that controls the relative spacing between the cone and the turntable, the cone and the turntable will be held in the operative position in which they are only closely spaced effectively for a predetemined number of revolutions of the conical roller. Thus if the motor should operate at a reduced speed, for any reason, then the turntable and roller will be held in the operative rolling position for a longer period of time.

Whilst in the described embodiment the spacing between the roller and the turntable is controlled by a cam and a cam follower various other arrangements could be used. For example the spacing between the toller and the turntable may be effected by solenoids, or by a hydraulic system, or by some other motorised system, and such a system may be controlled by a microprocessor or the like, The described apparatus may, of course, be provided with appropriate safety features, such as an interlock to ensure that the apparatus will not operate unless the cover has been moved to the lowered position.

I claim:

1. An apparatus for use in manufacturing a substantially circular dough product from a mass of dough, comprising:
    a turntable having a planar rolling surface formed in a plane, for supporting thereon the mass of dough, and rotatable about a turntable axis of rotation perpendicular to said planar surface;
    a rotatable conical roller having a roller axis of rotation and a conical rolling surface, said conical rolling surface having a rolling line spaced from said planar surface; and
    means for supporting said conical roller in spaced relation to said turntable, said supporting means including
        means for automatically changing the relative positions of said conical roller and said turntable from a first relative position in which a distance from said conical roller to said planar surface if relatively large and said conical roller is spaced from the mass of dough when the mass of dough is disposed on said planar surface, to a second relative position in which the distance from said conical roller to said planar surface is relatively small and said conical roller is in contact with the mass of dough along the rolling line when the mass of dough is disposed on the planar surface, then automatically maintaining said conical roller and said turntable in said second relative position for a predetermined operational period of time, and then automatically changing the relative positions of said conical roller and said turntable from the second relative position to the first relative position, and
    means for rotating the mass of dough on said planar surface about said turntable axis of rotation while said rolling ine is in contact with the mass of dough, such that said conical roller rolls on the mass of dough in rotation about said roller axis of rotation and said turntable rotates with the mass of dough about such turntable axis of rotation.

2. An apparatus as in claim 1, wherein said rolling surface has a greater resistance to dough sticking thereto than does said planar surface.

3. An apparatus as in claim 1, wherein said supporting means comprises a rotatable drive element, said conical roller being removably coupled to said rotatable drive element so that any of a plurality of different food processing elements including said conical roller may be coupled to and uncoupled from the apparatus.

4. An apparatus as in claim 1, wherein said supporting means comprises means for supporting said conical roller such that said rolling line is parallel to said plane and fixed with respect to said plane when said conical roller and said turntable are in said second relative position.

5. An apparatus as in claim 1, wherein said conical roller has an apex formed at an obtuse angle.

6. An apparatus as in claim 1, wherein said changing means includes a prime mover coupled to said conical roller for rotating said conical roller such that when the mass of dough is disposed on said surface and said conical roller is in said second relative position, rotation of said conical roller by said prime mover with said rolling line in contact with the mass of dough rotates the mass of dough and said turntable relative to said rolling line, and for automatically changing the relative positions of said conical roller and said turntable such that said conical roller and said turntable are maintained in said second position for a predetermined number of rotations of said conical roller.

7. An apparatus as in claim 6, wherein said supporting means comprises means for supporting said conical roller such that said rolling line is parallel to said plane when said conical roller and said turntable are in said second relative position.

8. An apparatus as in claim 6, wherein said prime mover comprises a motor and said changing means further includes a cam, said motor driving said conical roller and said cam in rotation, the apparatus, further comprising gear box means coupled to the said motor for rotating said cam slower than said conical roller, said cam being coupled to one of said conical roller and said turntable so as to move said one of said conical roller and said turntable relative to the other through a predetermined sequence of movements in a direction defined by positions thereof in said first and second relative positions.

9. An apparatus as in claim 8, further comprising adjustment means, having a surface between said conical roller and said turntable engaging said cam, and including means for adjusting the position of said surface, so as to adjust the distance from said rolling line of said conical roller to said planar surface when said conical roller and said turntable are in said second relative position.

10. An apparatus as in claim 1, wherein said planar surface and said rolling surface each have a non-stick finish.

11. An apparatus as in claim 10, wherein the non-stick finish on said rolling surface has a greater non-stick characteristic than the non-stick finish on said planar surface.

12. An apparatus for use in manufacturing a substantially circular dough product from a mass of dough, comprising:
a turntable having a planar rolling surface formed in a plane, for supporting thereon the mass of dough, and rotatable about a turntable axis of rotation perpendicular to said planar surface;
a rotatable conical roller having a roller axis of rotation and a conical rolling surface, said conical rolling surface having a rolling line spaced from said planar surface; and
means for supporting said conical roller in spaced relation to said turntable, said supporting means including:
means for automatically changing the relative positions of said conical roller and said turntable from a first relative position in which a distance from said rolling line of said conical roller to said planar surface is relatively large and the rolling line is spaced from the mass of dough when the mass of dough is disposed on said planar surface, to a second relative position in which the distance from said rolling line to said planar surface is relatively small, said rolling line is fixed with respect to said plane and said rolling line is in contact with the mass of dugh when the mass of dough is disposed on said planar surface, then automatically maintaining said conical roller and said turntable in said second relative position for a predetermined operational period of time, and then automatically changing the relative positions of said conical roller and said turntable from the second relative position to the first relative position, and
means for rotating the mass of dough on said planar surface about said turntable axis of rotation while said rolling line is in contact with the mass of dough, such that said conical roller rolls on the mass of dough in rotation about said roller axis of rotation and said turntable rotates with the mass of dough about said turntable axis of rotation.

13. An apparatus for use in manufacturing a substantially circular dough product from a mass of dough, comprising:
a turntable having a planar rolling surface formed in a plane, for supporting thereon the massive dough, and rotatable about a turntable axis of rotation perpendicular to said planar surface;
a rotatable conical roller having a roller axis of rotation and a conical rolling surface, said conical rollling surface having a rolling line spaced from said planar surface; and
drive means for supporting said conical roller in spaced relation to said turntable, said supporting means including:
drive means for rotating said conical roller about said roller axis of rotation, and
means for automatically changing the relative positions of said conical roller and said turntable from a first relative position in which a distance from said conical roller to said planar surface is relatively large to a second relative position in whcih the distance from said conical roller to said planar surface is relatively small, then automatically maintaining said conical roller and said turntable in said second relative position for a predetermined operational period of time, and then automatically changing the relative positions of said conical roller and said turntable from the second relative position to the first relative position, such that when the mass of dough is disposed on said planar surface and said conical roller is in said second relative position, rotation of said conical roller by said drive means with said rolling line in contact with the mass of dough rotates said turntable through said rolling line and the mass of dough.

* * * * *